United States Patent
Rudduck et al.

(10) Patent No.: US 8,698,596 B2
(45) Date of Patent: Apr. 15, 2014

(54) APPARATUS AND METHOD FOR ACCESSING A SECURED STORAGE SPACE

(75) Inventors: Dickory Rudduck, Chicago, IL (US); Christopher Kelliher, Chicago, IL (US); Benjamin Ford, Chicago, IL (US); Anthony White, Vernon Hills, IL (US)

(73) Assignee: Telezygology, Inc., Chicago, IL (US)

( * ) Notice: Subject to any disclaimer, the term of this patent is extended or adjusted under 35 U.S.C. 154(b) by 215 days.

(21) Appl. No.: 12/881,772

(22) Filed: Sep. 14, 2010

(65) Prior Publication Data
US 2012/0062362 A1    Mar. 15, 2012

(51) Int. Cl.
*H04L 9/32*    (2006.01)

(52) U.S. Cl.
USPC ............................ 340/5.73; 340/5.2; 235/375

(58) Field of Classification Search
USPC ............ 340/5.7, 5.73, 5.64, 1.1, 5.1, 5.2, 5.6
See application file for complete search history.

(56) References Cited

U.S. PATENT DOCUMENTS

| | | | |
|---|---|---|---|
| 2002/0035515 A1* | 3/2002 | Moreno | 705/26 |
| 2002/0080030 A1* | 6/2002 | Inomata | 340/542 |
| 2004/0254802 A1* | 12/2004 | Miller et al. | 705/1 |
| 2005/0075989 A1* | 4/2005 | Biasi et al. | 705/404 |
| 2006/0179724 A1* | 8/2006 | Lee | 52/79.1 |

* cited by examiner

*Primary Examiner* — Brian Zimmerman
*Assistant Examiner* — Sara Samson
(74) *Attorney, Agent, or Firm* — Heather A. Kartsounes

(57) ABSTRACT

Access to one or more storage areas is controlled. An indication that a packaged asset is available for delivery to an intended recipient, an indication of a size of the asset, and an identity of the intended recipient are received. An available storage space is determined based at least in part upon the size of the asset and the identity of the intended recipient. When a storage space is determined to be available for the packaged asset, an access code is transmitted to the intended recipient allowing the intended recipient to access the available storage space using the access code.

11 Claims, 18 Drawing Sheets

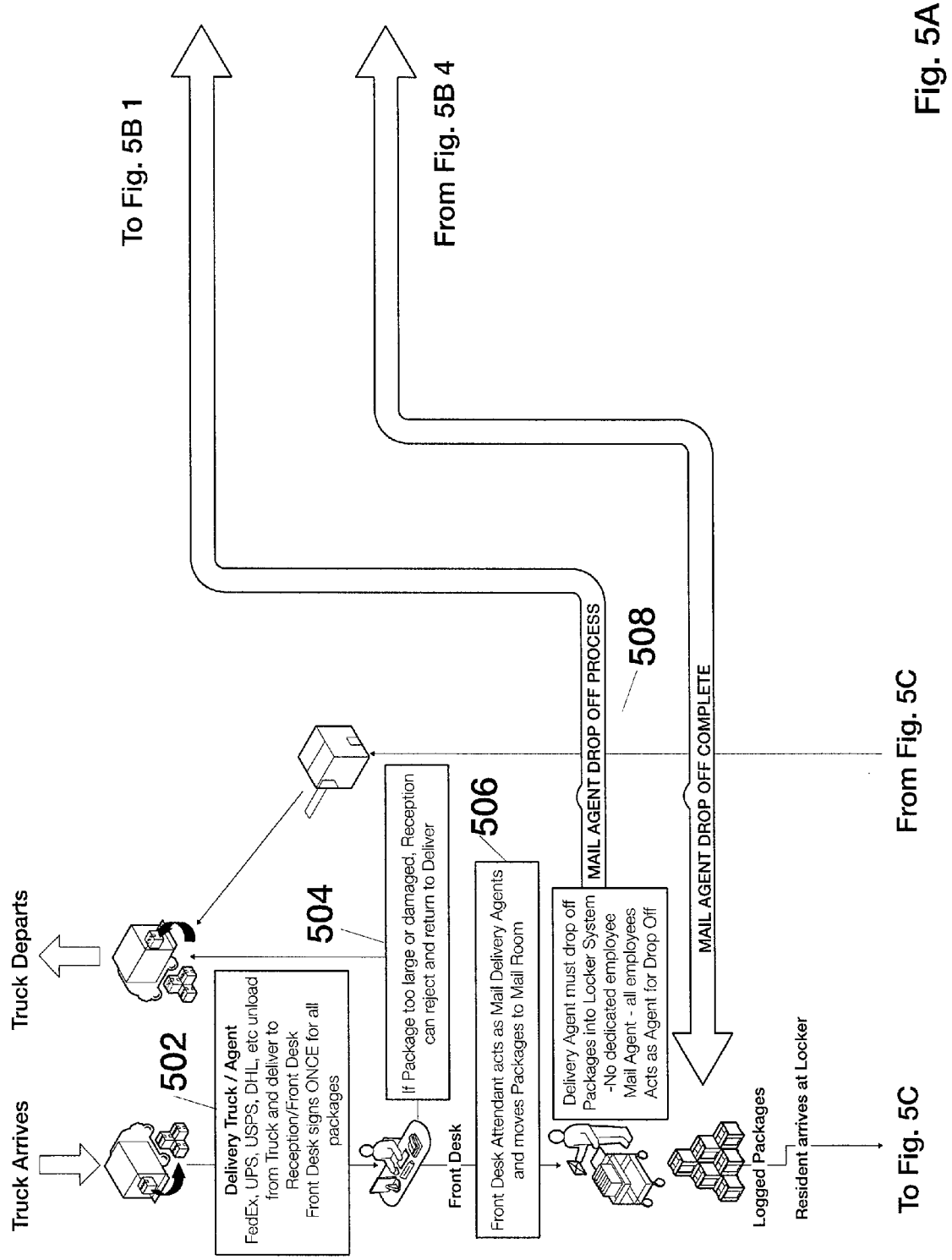

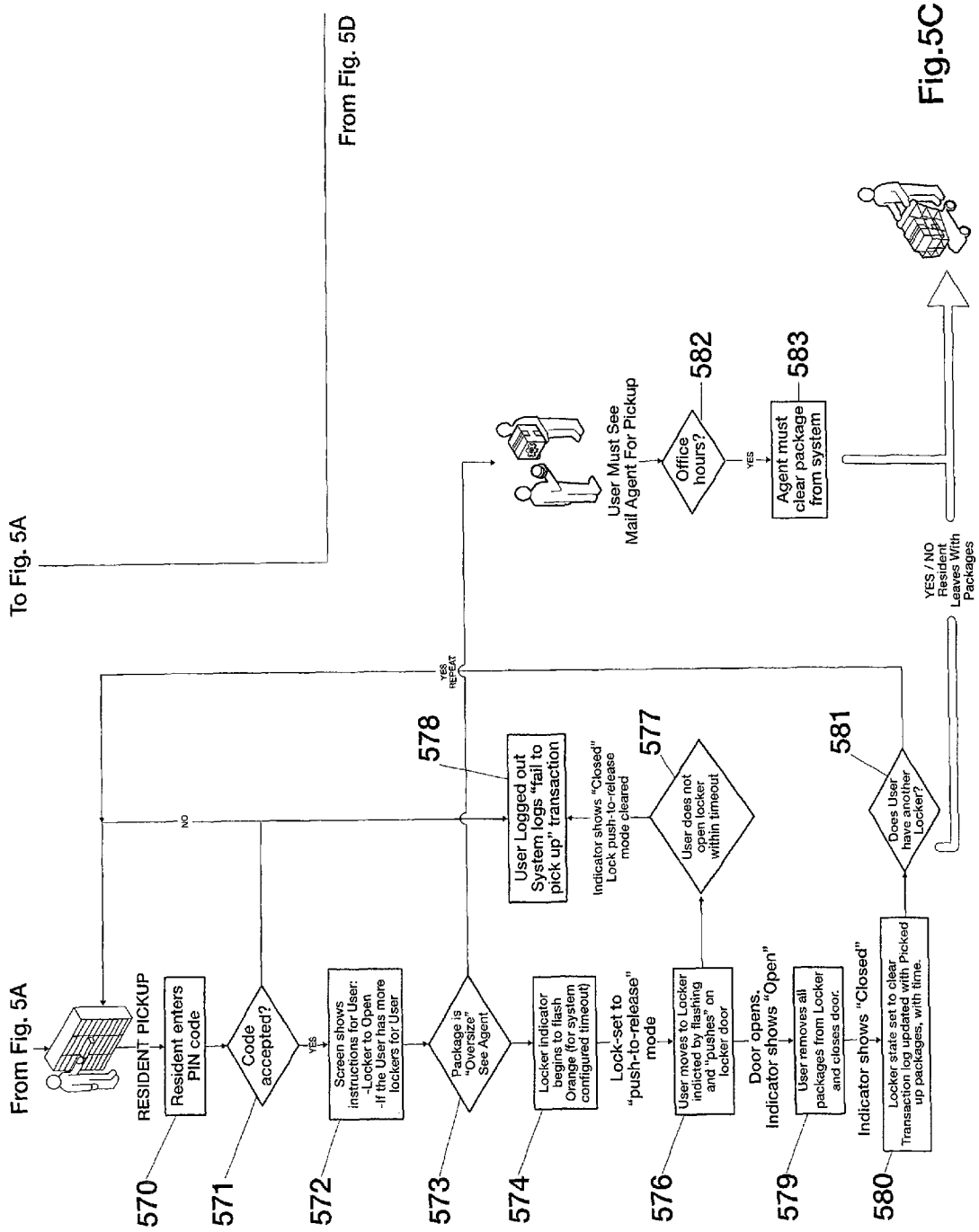

607 Step 7: The application will open a locker

Now follow the instructions on the Package Drop Off screen

1. Scan Package
2. Drop Off Package
3. Scan Door
4. Close Door

608 Step 8: Selects the Confirm Scans button

Fig. 6F

611 Step 11: Also displayed is a message Would you like to drop off another package? Select No

612 Step 12: The application displays the Home screen

Fig. 7A
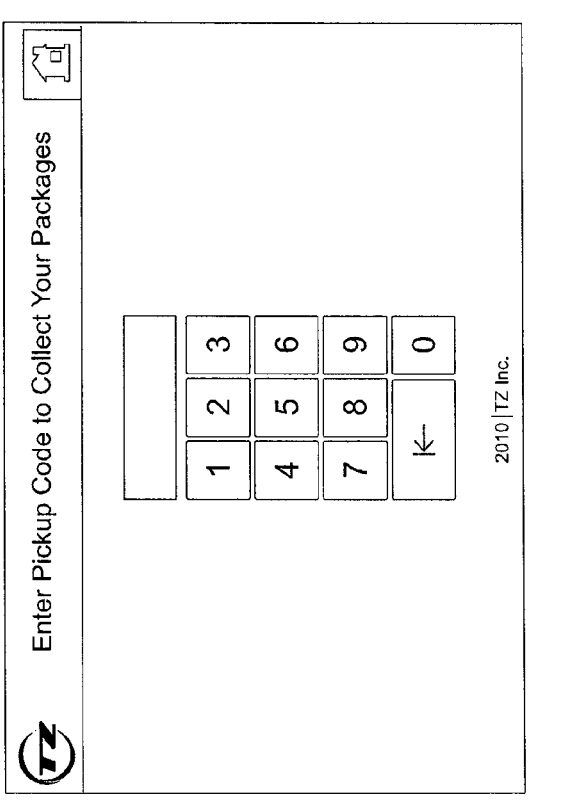
701 Step 1: Select the Pickup button from the from the *Home* screen
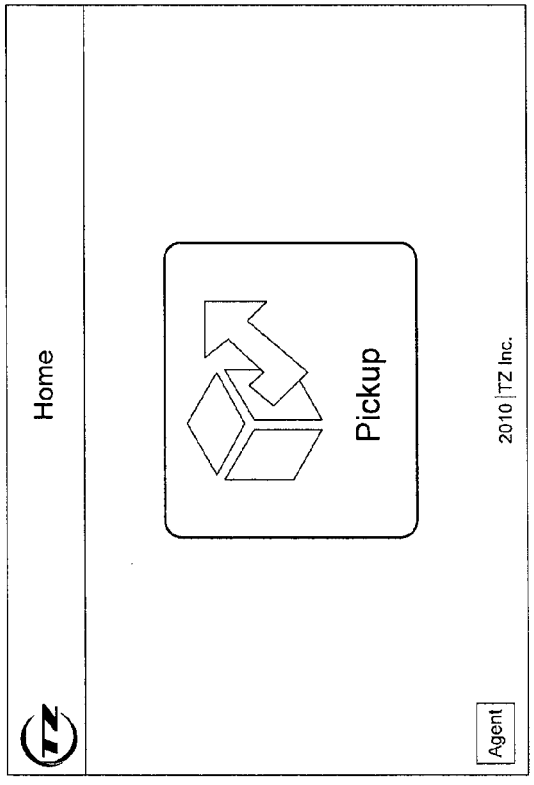
702 Step 2: Enter a *Pickup Code*

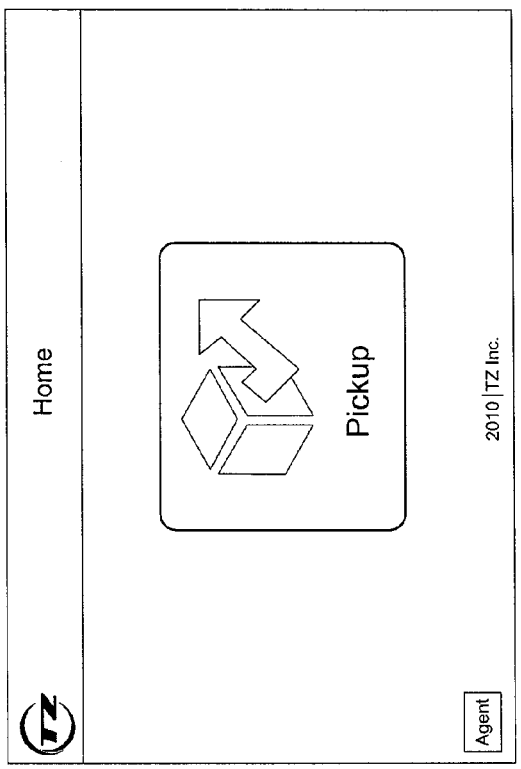
704 Step 4: The application displays the *Home* screen
703 Step 3: Locker door opens and locker number displayed
Fig. 7B

APPARATUS AND METHOD FOR ACCESSING A SECURED STORAGE SPACE

CROSS REFERENCE TO RELATED APPLICATION

A United States provisional application entitled "System and Method for Managing Secured Storage Spaces" and having Ser. No. 61/382,693 is being filed on the same date as the present application, the contents of which is incorporated herein by reference in its entirety.

FIELD OF THE INVENTION

This application relates to storage areas and, more specifically to approaches for accessing these storage areas.

BACKGROUND

Different types of packages are delivered to recipients at various locations. In one example, packages are delivered to residents of apartment buildings. In this situation, a delivery person from a delivery service typically drops off a group of packages at the front desk of the apartment building where the packages are stored. When the recipient of the package returns to the apartment building, they can ask an attendant at the front desk for any packages that have been delivered during the day. The delivery person may leave a note at the recipient's door indicating that delivery was attempted and reminding the recipient to pick up the package.

This delivery approach suffers from various problems. To mention one shortcoming, a human attendant is required to receive and sign for the package. This can be costly for many apartment buildings to provide. This delivery approach also relies on the presence of the human attendant and/or the recipient to complete the delivery process. More specifically, the attendant has to retrieve the packages to give to the recipient. The packages are often unsorted and the attendant has to take time to find the correct package once the recipient arrives.

In addition, the recipient often has to periodically check to see if there are any packages waiting for them at the front desk. Further, the packages are often in an unsecured location which is susceptible to unauthorized entry and package theft. Package theft is a very common form of delivery theft, especially in locations where packages are not secured in a locked location until recipient pick-up. Records of package delivery, if they are maintained at all, are often hand-written and prone to error. Consequently, efficient management of package deliveries is difficult or impossible to achieve.

BRIEF DESCRIPTION OF DRAWINGS

FIGS. 5A-D are flowcharts showing an approach for controlling access to one or more secured areas according to various embodiments of the present invention;

FIG. 7 shows one example of a series of display screens displayed during package pick-up according to various embodiments of the present invention.

Figure 1:
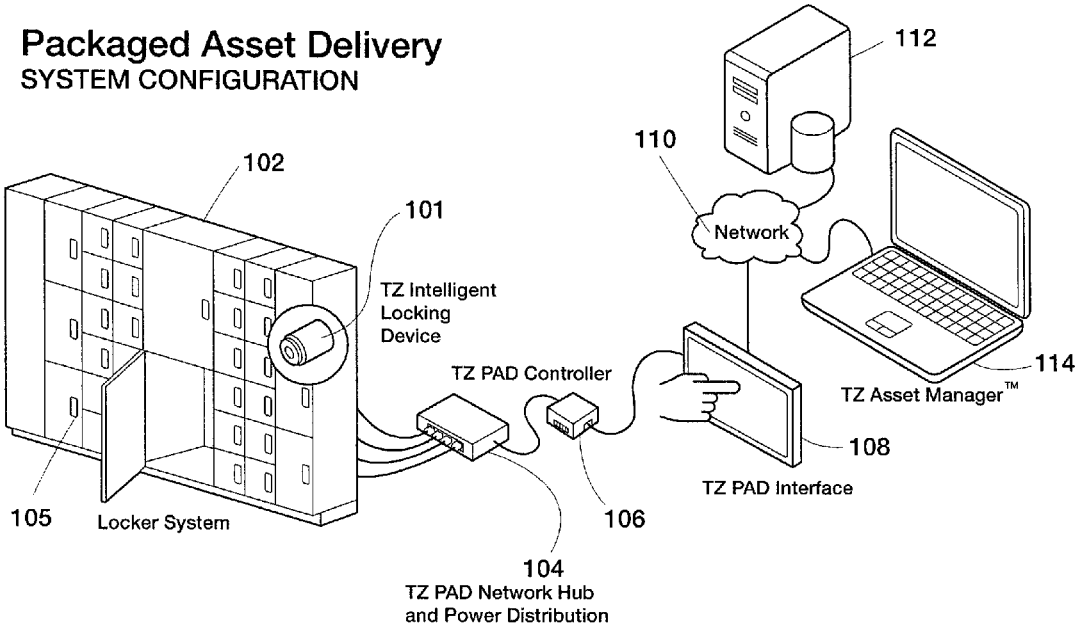
FIG. 1 is a block diagram showing a system for packaged asset delivery according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Approaches are provided that control access to one or more secured areas. The approaches allow packaged assets to be delivered to a recipient securely and easily without the requirement of a dedicated human attendant being available to receive and/or retrieve the packaged assets. The recipient is automatically informed of the delivery of the packaged asset and provided with an access code to open the secured area and retrieve the packaged asset. Accurate records (e.g., electronic logs) are automatically created and maintained to facilitate package tracking. The recipient can potentially retrieve the packaged asset at all hours of the day and night. Since the packaged assets are stored in a secured area, theft and other such problems are substantially reduced or eliminated.

In many of these embodiments, access to one or more storage areas is controlled. An indication that a packaged asset is available for delivery to an intended recipient, an indication of a size of the asset, and an identity of the intended recipient are received. An available storage space is determined based at least in part upon the size and/or weight of the asset and the identity of the intended recipient. When a storage space is determined to be available for the packaged asset, an access code is transmitted to the intended recipient allowing the intended recipient to access the available storage space using the access code.

When determining the available storage space, a real-time determination of the identity of a storage space may be made. The available storage space may be a storage space that is not currently being used by the recipient. In other aspects, the available storage space may be a storage space that is currently being used by the recipient. In still other aspects, the available storage space may be a storage space that is being shared by the recipient with another user.

The access code may be used to access the available storage space and retrieve the packaged asset from the storage space. A visual indicator may be deployed to identify the available storage space to the recipient so that the recipient can easily locate the space. In other aspects, once the access code actuates the locking apparatus, the barrier securing the available storage space may be pushed to open the storage space to the recipient. Alternatively, the barrier may be opened automatically (i.e., it may swing outward) upon receiving the access code. The barrier may be any type of device or structure used to control access to a secured area. For example, the barrier may be a swinging door, gate, garage door, or sliding door to mention a few examples.

In other examples, an electronic log of received packaged assets and intended recipients may be maintained. In some aspects, the log is accessible to a system administrator at substantially all times. This log may also maintain details of internal factors within the storage space, such as weight, temperature, and other environmental factors, The access code may be transmitted by the recipient in a variety of different ways. In one example, the access code is transmitted to the intended recipient via email. In another example, the access code is transmitted to the recipient over a wireless connection. In another example, the access code may be transmitted on a set or possibly delayed schedule depending upon the user's needs. Access codes may also be encrypted upon transmittal. Other examples of transmission approaches are possible.

In some examples, the recipient may pay for the storage space. For example, the recipient may pay a predetermined cost for a predetermined time period allowing them access to the space during that time period, pay higher costs for certain time periods, or pay higher costs for additional features (e.g., special indicator arrangements, additional electronic reminders, and so forth).

In some embodiments, the storage space may be mobile and can be moved from one location to another easily. The storage space may be on wheels or other suitable means to move the storage space. Other examples of approaches the provide mobility are possible.

In others of these embodiments, an apparatus for controlling access to one or more storage spaces includes an interface and a processor. The interface has an input and an output. The interface is configured to receive at the input an indication that a packaged asset is available for delivery to the intended recipient, an indication of the size (e.g., dimensions or general size) of the packaged asset, and the identity of the intended recipient.

The processor is coupled to the interface and is configured to determine an available storage space based at least in part upon the asset size and the identity of the intended recipient. The processor is further configured to, when a storage space is determined to be available for the packaged asset, transmit an access code to the intended recipient at the output of the interface allowing the intended recipient to access the available storage space using the access code.

As mentioned, the available storage space may be in one of several usage states with respect to the recipient. For example, the available space may not be currently used by the recipient, may be currently used by the recipient, or may be currently shared by the recipient with another user.

In other aspects, the processor is further configured to maintain a log of received packaged assets and intended recipients in a memory storage device. In some examples, the log in the memory storage device is accessible to a system administrator at substantially all times.

In some approaches, the output is coupled to an Internet connection and the access code is transmitted to the recipient in an email via the Internet connection. In still other examples, the processor is configured to receive a payment from the recipient for use of the available storage space via the input of the interface.

In still others of these embodiments, a system for controlling access to one or more storage spaces includes a local network and a plurality of locking arrangements communicatively coupled to the local network. Each of the plurality of locking arrangements secures a storage space. The system also includes a data entry device that is coupled to the local network; a wide area network that is coupled to the local network; and a system controller that is coupled to the wide area network.

The data entry device is configured to receive an indication that a packaged asset is available for delivery to an intended recipient, an indication of the asset size, and the identity of the intended recipient. The system controller is configured to determine an available storage space based at least in part upon the asset size and the identity of the intended recipient received from the data entry device via the wide area network. The system controller is further configured to, when a storage space is determined to be available for the packaged asset, transmit an access code to the intended recipient via the wide area network. The intended recipient can use the access code to open the locking arrangement that secures the available storage space and obtain the packaged asset.

The wide area network may be one or more networks such as the Internet, a cellular wireless network, and the plain old telephone system (POTS). Other examples of networks and combinations of networks are possible.

The local network may be a network such as a campus-wide network; a network covering a building or portions thereof or a network covering an office or portions thereof. Other examples are possible. In this respect and as used herein, "local network" refers to a network (or combination of networks) that are limited in geographic scope to a local area such as a building, apartment complex, campus, military base, or the like. A local network provides less geographic coverage than a wide area network (that, for example, covers states or countries) such as the Internet.

In some aspects, the available storage space is secured with a first locking arrangement disposed at a first end of the storage space and a second locking arrangement disposed at a second end of the storage space. The access code unlocks one of the first locking arrangement or the second locking arrangement.

The data entry device may be a device such as a touch screen device, a personal digital assistant, a cellular phone, or a personal computer. Other examples of data entry devices are possible.

Referring now to FIG. 1, one example of a system for packaged asset delivery is described. The system includes a locker system 102, a network hub 104, an interface controller 106, a data entry device 108, a network 110, memory storage 112, and an asset manager 114.

The locker system 102 is any type of storage arrangement where one or more storage spaces are secured by one or more locking arrangements. Each of the lockers has a locking arrangement (e.g., an electronic lock) that is communicatively coupled to the hub 104. The locking arrangements are actuated by reception of an access code that opens/releases the locking arrangement so as to allow a barrier securing the storage space to be opened thereby allowing access to the storage space. For simplicity, only one locking arrangement 105 is identified in FIG. 1 although it will be appreciated that each locker has a locking arrangement. It will be further appreciated that the locking arrangement 105 may be coupled to the hub 104 by any type of connection such as wired connection, wireless connection, and optical connection to mention a few examples. The lockers may have one or more environmental control devices 107 that control, adjust, or otherwise affect one or more environmental or physical conditions within the locker. For example, the environmental control device 107 may adjust lighting, temperature, pressure, or any other condition within the locker. In this respect, the environmental control device 107 may be a fan, light, air conditioner, freezer unit, or heating unit. Other examples are possible. Control of the environmental control device 107 may be accomplished from the asset manager 114 or the interface 108. For example, conditions within the locker may be monitored (e.g., via sensors) and commands may be issued from the asset manager 114 or the interface 108 to operate the environmental control device 107 and maintain various conditions within the locker within predetermined limits.

The network hub 104 is any type of network hub that connects the many connections from the locker system 102 to a single output connection coupled to the interface controller 106. The hub 104 may also provide for power distribution to the locker system 102.

The interface controller 106 is an interface connection that converts signals from one communication protocol to another. In one example, the controller 106 converts signals between a USB-type protocol and the RS-485 protocol. Other communication protocols and other types of conversions can also be used.

The data entry device 108 is any type of data entry device. The data entry device may be a device such as a touch screen device, a personal digital assistant, a cellular phone, and a personal computer. Other examples of data entry devices are possible. In the example of FIG. 1, the data entry device is a touch screen device.

The network 110 is any type of computer network including any type of local network, micro network, or wide area network. Combinations of these networks may also be used.

If the network 110 is a wide area network, the wide area network may be one or more networks such as the Internet, a cellular wireless network, or the plain old telephone system (POTS). Other examples of wide area networks are possible.

If the network 110 is a local area network, the local network may be a network such as a campus-wide network; a network covering a building or portions thereof; or a network covering an office or portions thereof. Other examples of local networks are possible.

The memory storage 112 may be any type of memory storage device used to store information regarding the locker storage 102. For example, logs describing assets that were delivered and/or intended recipients may be stored in the memory storage 112.

The asset manager 114 may be any combination of hardware/software that manages information related to the locker system 102 and the available storage spaces in the locker system 102. It may generate reports of available space, usage, and so forth. These reports may be stored in the memory storage 112 or communicated to an administrator (or others) for viewing via the network 110.

In one example of the operation of the system of FIG. 1, a delivery person delivers a packaged asset and enters an indication that a packaged asset is available for delivery to an intended recipient at the device 108. Alternatively, the delivery person may provide the packaged asset to another person (e.g., an attendant at the front desk of an apartment complex) and that person may perform the packaged asset delivery actions described below. The packaged asset as described herein may be a package (large, small, medium, oversized), an envelop, or any other type of package/enclosure.

The delivery person also enters an indication of a size of the asset and an identity of the intended recipient at the device 108. The size may be a general size (e.g., large, small, medium, oversized) or may be one or more dimensions (or a weight). The device 108 determines an available storage space in the lockers 102 based at least in part upon the size of the asset and the identity of the intended recipient. When a storage space is determined to be available for the packaged asset, an access code is transmitted from the device 108 to the intended recipient via the network 110 allowing the intended recipient to access the available storage space using the access code. The access code, in one example, is a randomly generated number. The locking arrangement 105 of the locker system 112 may be programmed to accept this access code and allow this access code to open the locking arrangement 105. The asset manager 114 may create and maintain a log of transactions and store these in memory storage 112.

To retrieve the packaged asset, the recipient may go to the device 108, enter the code, and thereby access the packaged asset in the assigned locker. The access code may actuate a locking arrangement that allows or causes a barrier (e.g., a locker door) to be opened. The code entered by the recipient may be compared to a list of acceptable codes at the device 108. An indicator 101 may alert the user as to the correct locker. The indicator may be an LED in one example. There may be an indicator for a group of lockers, or one indicator for each locker. The color of the indicator may change depending upon the state of the secured space. For example, one color may be used when the locker is closed, another color (or another action such as the indicator flashing) when the recipient accesses the space, and still another color when the secured space is opened.

In some examples, the available storage space in the lockers 102 is secured with a first locking arrangement disposed at a first end of the storage space and a second locking arrangement disposed at a second end of the storage space. The access code unlocks one of the first locking arrangement or the second locking arrangement. This allows a delivery person to use one door to access the storage space and the recipient to use a second door to access the same space. Advantageously, these doors may be disposed opposite to each other.

The door of the locker 102 securing the available storage space may be pushed once the code allows access. This prevents the door flying open and causing potential injury to the recipient. Alternatively, the door may be opened automatically upon receiving the access code.

Figure 2:
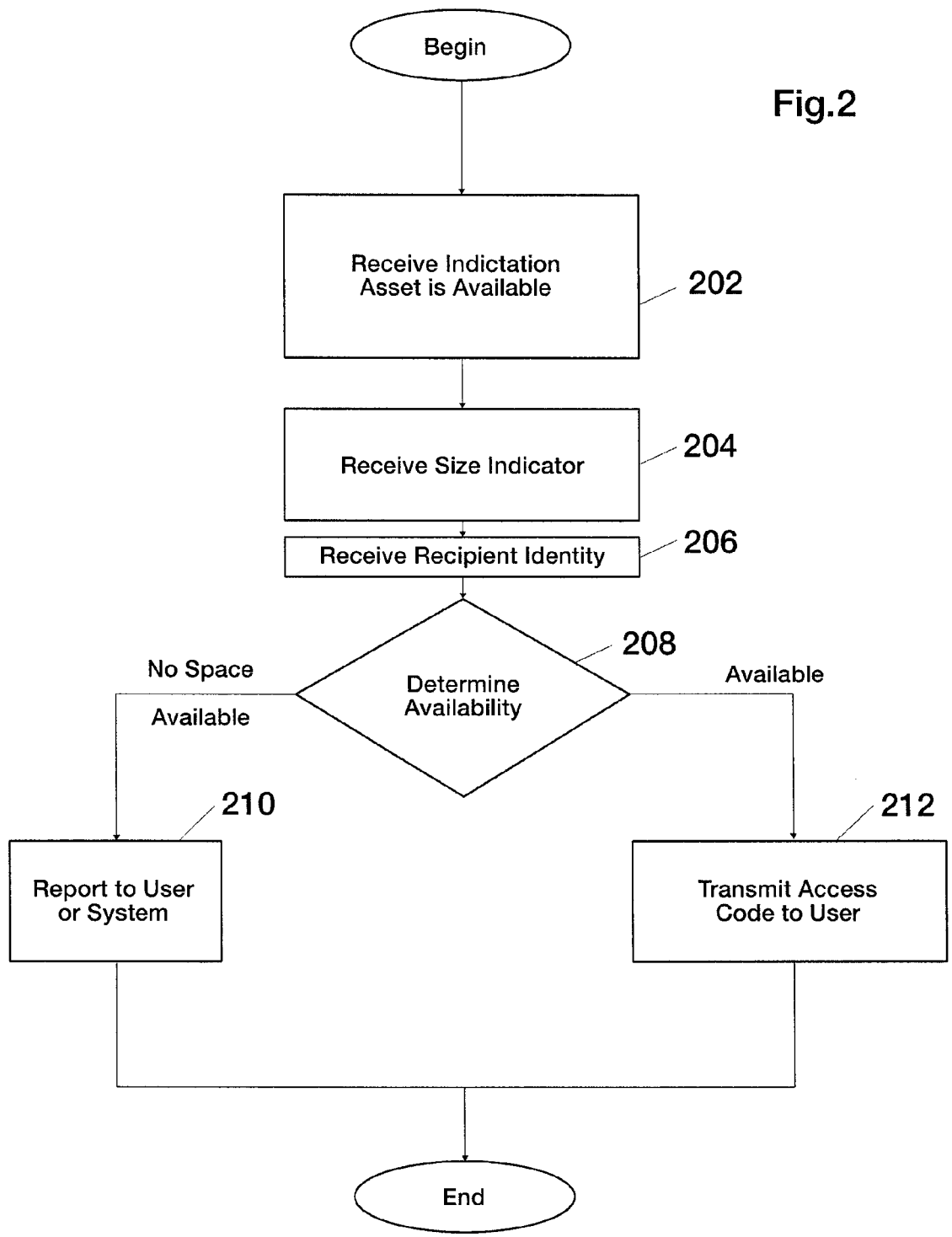
FIG. 2 is a flowchart showing an approach for controlling access to a secured area according to various embodiments of the present invention.

Referring now to FIG. 2, one example of an approach for controlling access to a secured area is described. At step 202, an indication that a packaged asset is available for delivery to an intended recipient is received. For example, a delivery person may enter this via a touch screen or some other data entry device. In another example, at least some of this information may be scanned in (e.g., scanning an RFID tag). At step 204, an indication of a size of the asset is received. As with step 202, a delivery person may enter this information via a touch screen or some other data entry device. At step 206, an identity of the intended recipient is received. In another example, at least some of this information may be scanned in (e.g., scanning an RFID tag). As with steps 202 and 204, a delivery person may enter this information via a touch screen or some other data entry device. In another example, at least some of this information may be scanned in (e.g., scanning an RFID tag).

At step 208, an available storage space is determined based at least in part upon the size of the asset and the identity of the intended recipient. For instance, a determination may be made if a space is available and the identity of that space. If there is no available space, at step 210 a report/message is sent to the recipient and/or the system administrator. At step 212, when a storage space is determined to be available for the packaged asset, an access code is transmitted to the intended recipient allowing the intended recipient to access the available storage space using the access code.

When determining the available storage space at step 208, a real-time determination of the identity of a storage space may be made. The available storage space may be a storage space that is not currently being used by the recipient. In other aspects, the available storage space may be a storage space that is currently being used by the recipient. In still other aspects, an available storage space may be a storage space that is being shared by the recipient with another user.

The access code may be used to access the available storage space and retrieve the packaged asset from the available storage space. A visual indicator (e.g., LED) may be deployed to identify the available storage space to the recipient. This indicator may also be used during the package delivery process to indicate to the agent the location of the storage space where to store the packaged asset.

In other examples, an electronic log of received packaged assets and intended recipients may be maintained. In some of these examples, the log is accessible to a system administrator at substantially all times.

The access code may be transmitted to the recipient at step 212 in a variety of different ways. In one example, the access code is transmitted to the intended recipient via email across the Internet. In another example, the access code may be sent to a cellular phone or personal digital assistant of the user via a wireless network. Other examples of delivery approaches are possible.

In some examples, the recipient may pay for the storage space. For example, the recipient may the same cost for a predetermined time period, pay higher fees for certain time periods (e.g., for use during the Christmas holidays to mention one example), or pay higher fees for additional features (e.g., a higher number/frequency of reminder emails).

Figure 3:
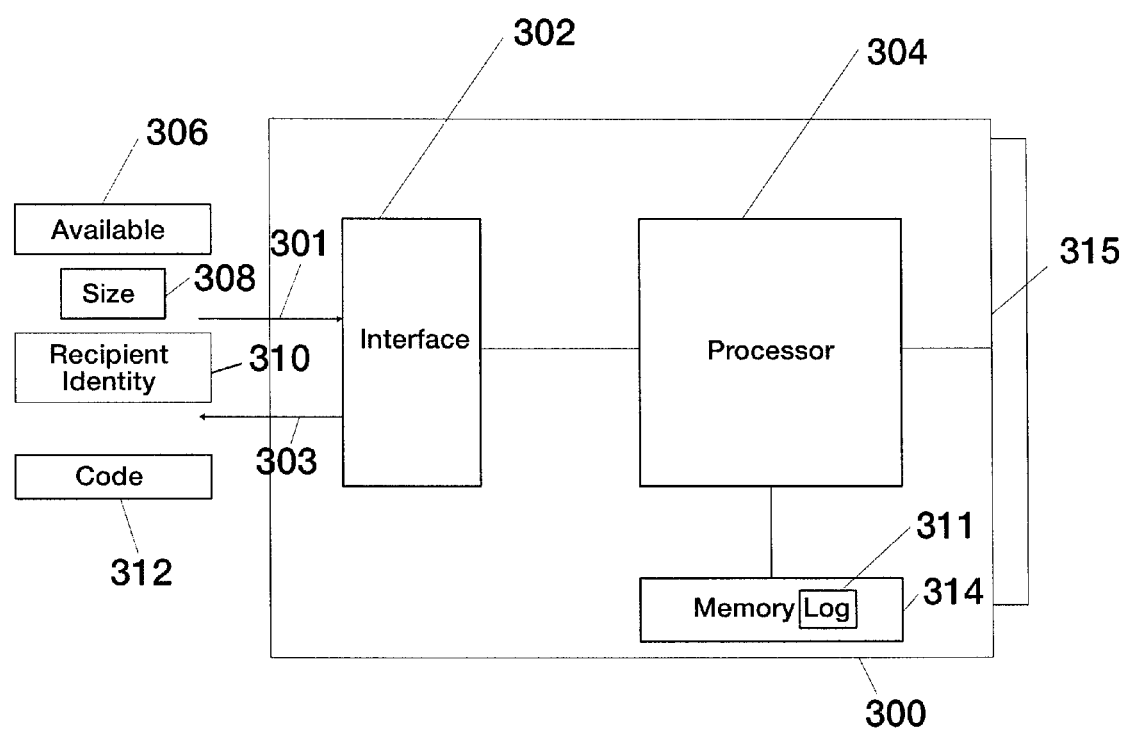
FIG. 3 is a block diagram showing an apparatus for controlling access to a secured area according to various embodiments of the present invention.

Referring now to FIG. 3, one example of an apparatus 300 for controlling access to a secured area is described. The apparatus 300 includes an interface 302 and a processor 304. The interface 302 has an input 301 and an output 303 and is configured to receive at the input 301 an indication 306 that a packaged asset is available for delivery to an intended recipient, an indication 308 of asset size, and an identity 310 of the intended recipient.

The processor 304 is coupled to the interface 302 and is configured to determine an available storage space based at least in part upon the asset size 308 and the identity of the intended recipient 310. The processor 304 is further configured to, when a storage space is determined to be available for the packaged asset, transmit an access code 312 to the intended recipient at the output 303 of the interface 302 allowing the intended recipient to access the available storage space using the access code 312.

As mentioned, the available storage space may be a space that is not currently being used by the recipient, currently being used by the recipient, or currently being shared by the recipient with another. Other examples and combinations of storage usage patterns are possible.

In other aspects, the processor 304 is further configured to maintain a log 311 of received packaged assets and the intended recipients in a memory storage device 314. In some examples, the log 311 in the memory storage device 314 is accessible to a system administrator at substantially all times.

In some approaches, the output 303 is coupled to an Internet connection and the access code 312 is transmitted to the recipient in an email via the Internet connection. In still other examples, the processor 304 is further configured to receive a payment from the recipient for use of the available storage space via the input 301 of the interface 302.

The apparatus includes a touch screen 315 that is coupled to the processor 304. The touch screen 315 allows a delivery person (or attendant) to enter delivery information (e.g., that a package is available, the package size, and/or the intended recipient). The screen 315 also provides an interface for the package recipient to enter the access code the retrieve the packaged asset. The memory 314 may also store a list of possible recipients that can be displayed on the screen 315. The input 301 and output 303 may be coupled to the locking arrangements and to other networks/network elements.

It will be understood that the apparatus 300 may be a wide variety of devices. For example, the apparatus 300 may be a touch screen device. In other examples, the apparatus 300 may be a personal computer and the screen 315 may be disposed at a personal computer.

It will be appreciated that the elements shown in FIG. 3 may be housed in a single and compact housing unit that can be located near a storage center (e.g., a locker arrangement). This allows the apparatus 302 to be disposed in compact areas. However, some or all of the elements may be moved to other and separate locations (e.g., to a system controller that controls locking arrangements via a wide area network).

Figure 4:
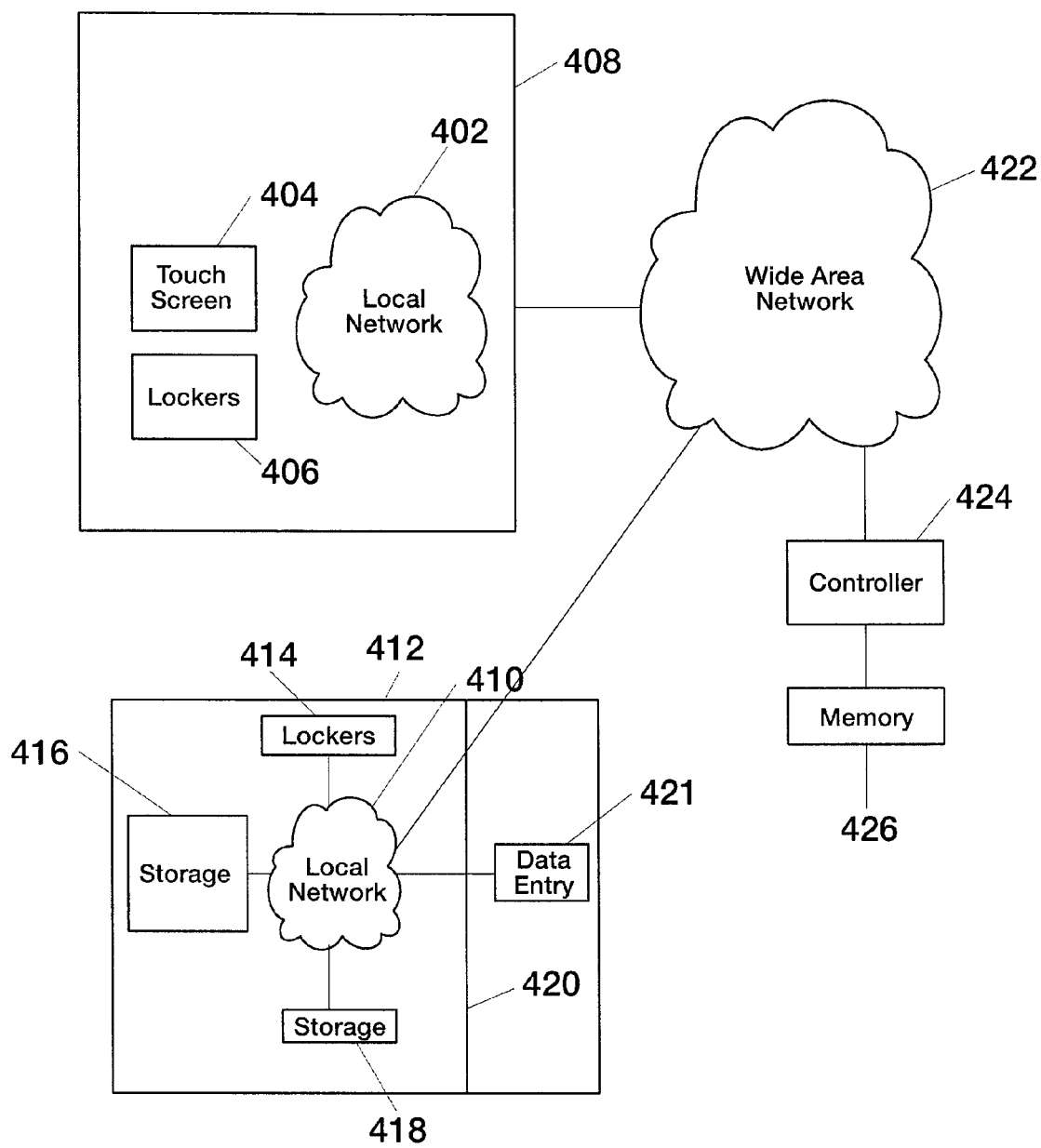
FIG. 4 is a block diagram showing a system for controlling access to one or more secured areas according to various embodiments of the present invention.
Figure 5B:
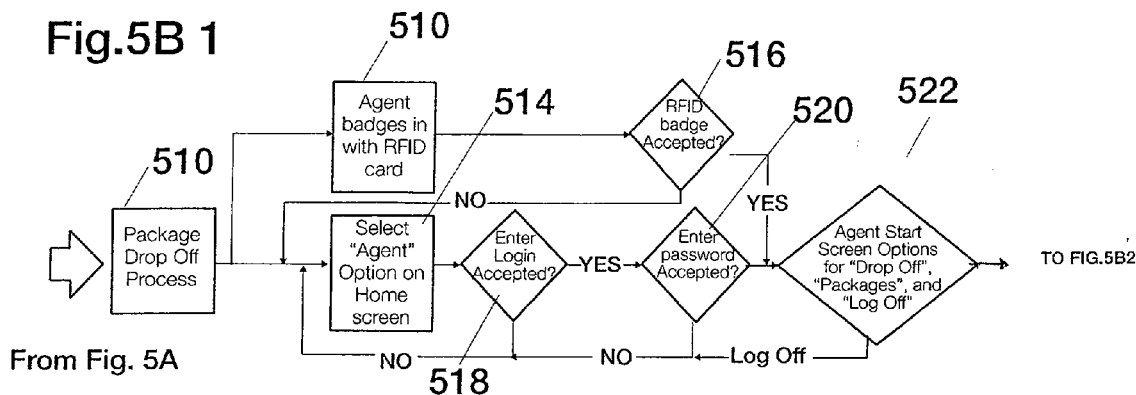
Figure 5B:
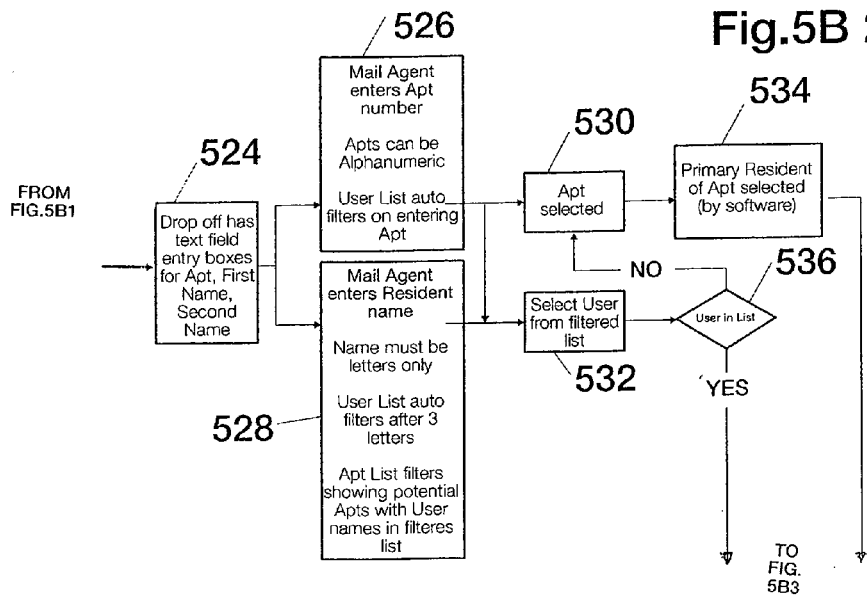
Figure 5B:
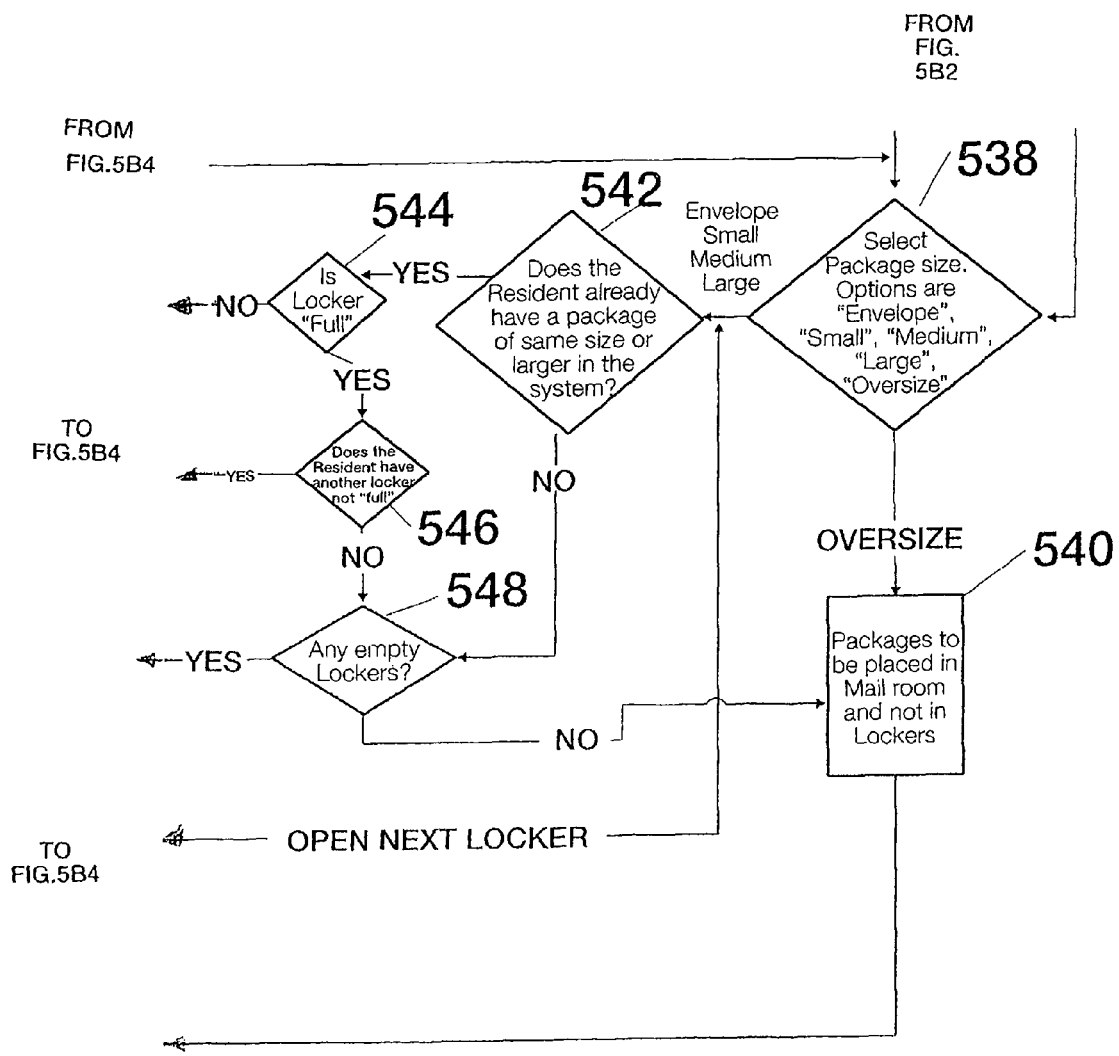
Figure 5B:
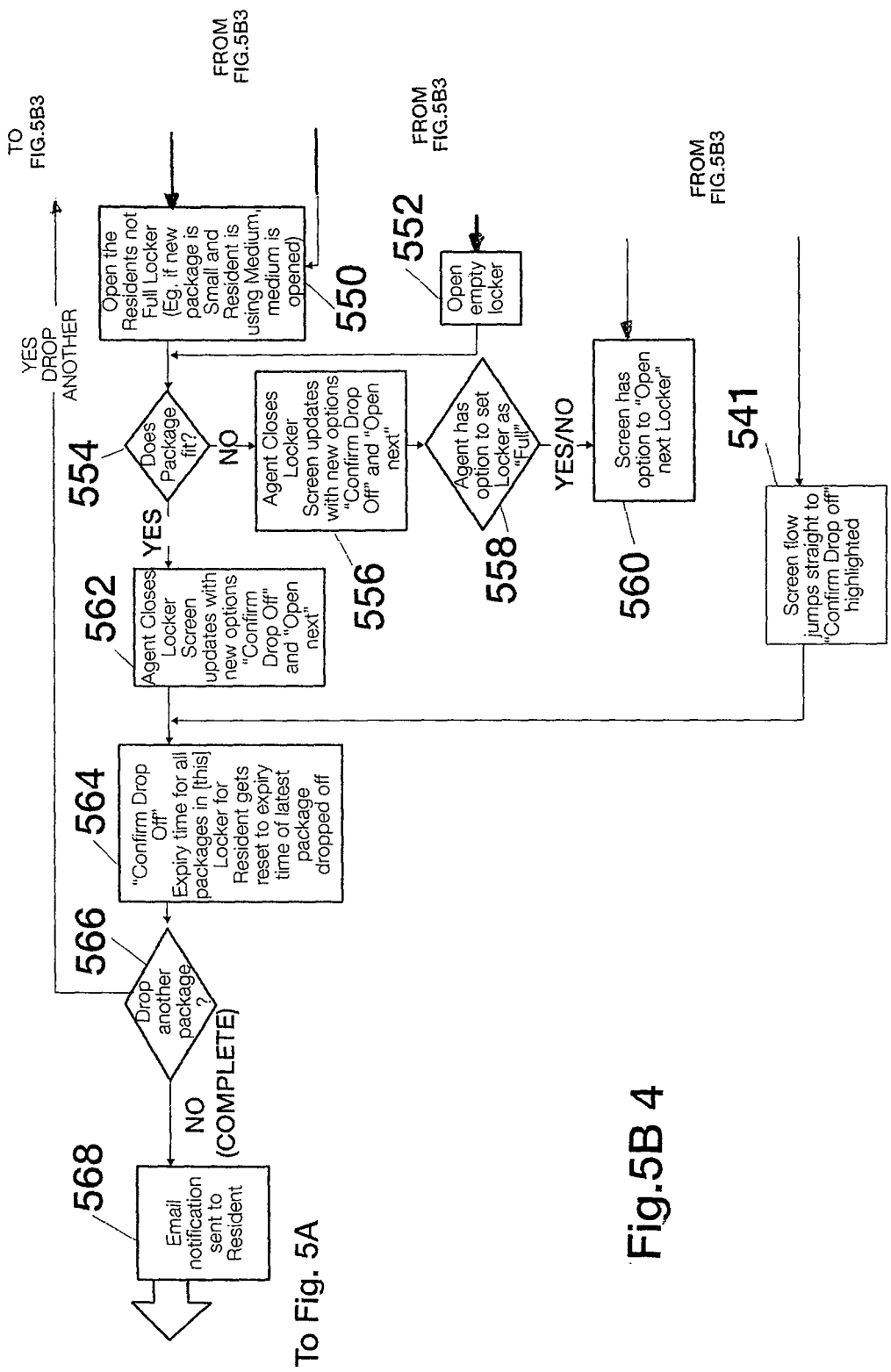
Figure 5D:
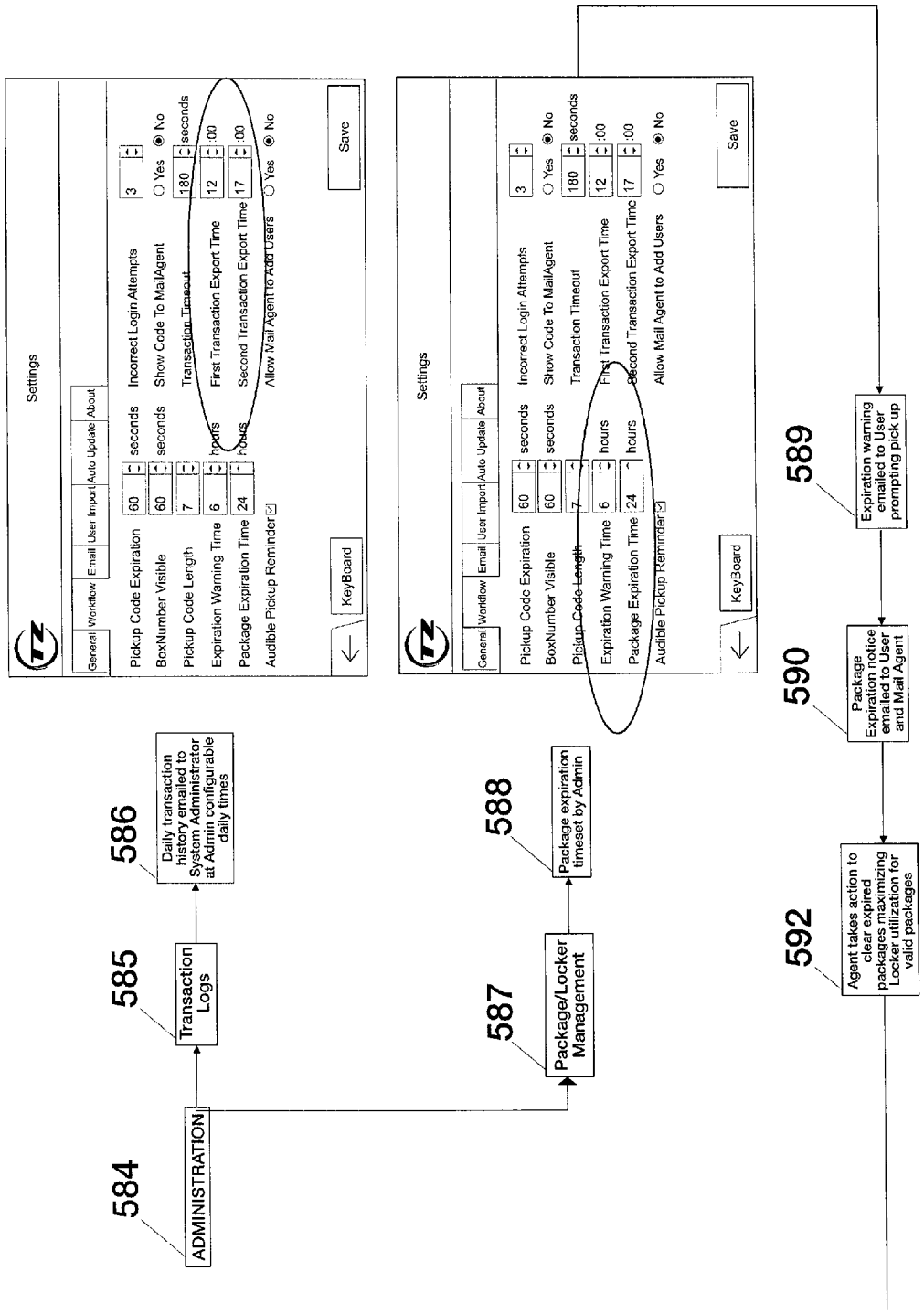

Referring now to FIG. 4, one example of a system for controlling access to one or more secured areas is described. The system 400 includes a first local network 402 and a plurality of locking arrangements (e.g., electronic locks) at lockers 406. These locking arrangements are communicatively coupled to the first local network 402. Each of the plurality of locking arrangements 406 secures a storage space. A data entry device (e.g., touch screen) 404 is coupled to the local network 402. A wide area network 422 is coupled to the local network 402 and a system controller 424 is coupled to the wide area network 422. The local network 402, touch screen 404 and lockers 406 may be disposed in a first building 408.

A second local network 410 is coupled to locking arrangements at lockers 414, locking arrangements at storage facility 416, locking arrangements at storage facility 418, and a data entry device 421. Each of the lockers 414, storage facility 416, and storage facility 418 includes individual secured storage areas (e.g., lockers) that are secured by one or more of the respective locking arrangements. The data entry device (e.g., a touch screen device) 421 is coupled to the local network 410. The local network 410, data entry device 421, lockers 414, storage facility 416, and storage facility 418 may be in a second building 412.

The data entry devices 404 and 421 are configured to receive an indication that a packaged asset is available for delivery to an intended recipient, an indication of asset size, and an identity of the intended recipient. For example, a delivery person or attendant may enter this information via the particular data entry device 404 or 421. The system controller 424 is configured to receive this information (that is transmitted to the controller 424 via the local area networks 402 or 410, and the wide area network 422) and determine an available storage space based at least in part upon the asset size and the identity of the intended recipient.

The system controller 424 is further configured to, when a storage space is determined to be available for the packaged asset, transmit an access code to the intended recipient via the wide area network 422. For example, the access code may be emailed to the intended recipient, or sent to the recipient's cellular phone or personal digital assistant. The intended recipient can use the access code to open the locking arrangement securing the available storage space and obtain the packaged asset. More specifically, the recipient may go to the data entry device 404 or 421 and enter the code.

The wide area network 422 may be one or more networks such as the Internet, a cellular wireless network, or the plain old telephone system (POTS). Other examples and combinations of wide area networks are possible.

The local networks 402 or 410 may be networks such as campus-wide networks; networks covering a building or portions thereof; or networks covering an office or portions thereof. Other examples of local networks are possible.

In some aspects, the available storage space is secured with a first locking arrangement disposed at a first end of the storage space and a second locking arrangement disposed at a second end of the storage space. The access code unlocks one of the first locking arrangement or the second locking arrangement.

The data entry devices 404 or 421 may be a device such as a touch screen device, a personal digital assistant, a cellular phone, and a personal computer. Other examples of data entry devices are possible.

It will be understood that some or all of the functions of the controller 424 may be moved to the data entry device 404 or 421. For example, the code-generating function in the controller 424 may be moved to the touch screen 404 or 421. In some examples, all functions are moved and the system controller need not be used. In other aspects, the data entry devices 404 and/or 421 may be moved to be coupled to the locking arrangements without being coupled to an intervening local network.

A log of recipients, drop off times, and recipients may be maintained at a memory 426 that is coupled to the controller 424. Other types of information and other types of reports may be generated at the system controller 424 and stored at the memory 426.

Referring now to FIGS. 5A-D one example of an approach for controlling access to one or more secured areas is described. It will be appreciated that this example illustrates approaches particularly useful for an apartment building with a locker system. It will also be appreciated that the steps described for this particular example may be changed to suit the needs of the particular user and/or system. It will also be understood that the steps be applied, changed, or otherwise modified to suit the particular needs of other deployment environments or locations.

The process begins when a delivery truck (or other vehicle) delivers packages to the front desk of the apartment complex at step 502. An attendant at the front desk signs once for all packages. Alternatively, the attendant may be omitted and the delivery person can perform the delivery steps.

At step 504, if the package is too large or damaged, the attendant at the front desk can reject the package and return the package to the delivery person. In this case, the packages can be returned immediately or at a later time.

At step 506, the front desk attendant acts as a delivery agent and moves the packages to the mail room (or other location where the lockers are physically located). At step 508, the delivery agent drops off the packages at the locker system. There need be no dedicated employee at the locker system to receive the packages. However, all employees may act as an agent for drop off as needed.

At step 510, the package drop-off process begins. The agent may begin at either steps 512 or 514.

At step 512, an agent "badges-in" with an RFID card. At this step, a card presented by the agent is read by an RFID reader device and a determination is made if the agent is a legitimate agent. Control continues at step 516, where it is determined if the RFID badge is accepted. If the answer at step 516 affirmative, then execution continues at step 522. If the answer at step 516 negative, execution continues at step 514.

At step 514, the "agent" option is selected at the keypad. For example, the agent presses an icon on the touch screen to provide this option. At step 518, the agent enters login (e.g., user name information) and a password and it is determined if the login information has been accepted. If the answer is negative at step 518, control returns to step 514. If the answer is affirmative at step 518, control continues at step 520 where it is determined if the password is accepted. If the answer at step 520 is negative, execution continues at step 514. If the answer at step 520 is affirmative, execution continues at step 522 where the agent selects options for "drop off," "packages" or "log off." If "log-off" is selected, then control returns to step 514. Otherwise control continues at step 524.

At step 524, the "drop-off" option is selected and one or more of the apartment number, first name, and second name are filled in at the touch screen by the agent. Two paths, one beginning at step 526 and the other with step 528, may be followed.

If the path beginning at step 526 is followed, the agent enters the apartment number. In many of these examples, the apartment number is alphanumeric. A user list may also auto filter as the apartment number is entered (such that as particular characters are entered, entries with those characters are displayed). At step 530, the apartment number is selected (or step 532 is followed where the user is selected from a list). At step 534, the primary resident of the apartment may be selected automatically. Execution continues at step 538.

If the path beginning at step 528 is followed, the agent enters the recipient's name. Auto-filtering may also occur at this step. At step 532, the user may be selected from the user list. At step 536, it is determined if the user is on the list. If the answer is negative, control returns to step 530. If the answer is affirmative, control continues at step 538.

At step 538, the package size is selected by the agent. Some package size options include envelope, small, medium, large or oversize. Alternatively, dimensions and/or weights can be entered. Other options are possible.

If the package is "oversize," at step 540 package is placed somewhere besides the lockers. At step 541, the screen flow jumps to show confirm drop-off that is high-lighted. Control continues at step 564.

If the package is not "oversize," at step 542, it is determined if the resident already has a package of the same size or larger that has been recorded by the system as being stored in the lockers. If the answer is negative, at step 548, it is determined if there are any empty lockers. At step 552, an empty locker is opened and control continues at step 554.

If the answer at step 542 is affirmative, at step 544 it is determined if the locker is full. If the answer is negative, execution continues at step 550 and if the answer is affirmative, control continues at step 546.

At step 550, the recipient's unfilled locker is opened and the package can be placed there by the agent. Execution continues at step 554.

At step 546, it is determined if the resident has another assigned locker that is not full. If the answer is negative, execution continues with step 548. If the answer at step 546 is affirmative, execution continues at step 550.

At step 554, it is determined if the package fits in the locker. In this respect, the agent may attempt to fit the package into the locker. If the answer is negative at step 554, at step 556 the agent closes the door of the locker without placing the package in the locker. At step 558, the agent may be provided the option to set the locker state as "full." At step 560, the screen may display "open next locker." Execution then continues at step 542 as described above.

If the answer at step 554 is affirmative, at step 562 the agent closes the locker with the package placed in the locker. At step 564, a "Confirm drop off" is displayed on the screen. The expiry time for all packages in this locker for this resident is reset to begin expiring from when the latest package that has been dropped off.

At step 566, it is determined if there is another package to drop off. If the answer is affirmative, control returns to step 538. If the answer is negative, at step 568 an email notification (or other type of notification) is sent to the resident. The drop-off process is now complete.

The retrieval process is now described. At step 570, the resident enters the code that they have been provided. At step 571, it is determined if the code is accepted. This acceptance may be accomplished by comparing the code to a set of authorized codes (stored at the touch screen device in one example). If the answer is negative, control continues at step 570 and execution continues as has been described above.

If the answer at step 571 is affirmative, then at step 572 the screen shows instructions for the user to follow, for example, to identify a particular locker (or lockers) associated with the code when the user has been assigned multiple lockers.

At step 573, it is determined if the package is "oversize." If the answer is affirmative, at step 583 the recipient goes to the agent and at step 582 the office hours of the agent may be determined by the recipient. At step 582, the agent gives the "oversize" package to the recipient and at step 583 agent clears the package from the system.

If not an "oversize" package, at step 574 the locker indicator begins to flash orange (or some other appropriate color). The lock securing the locker is set to push-to-release mode. At step 576, the recipient moves to the locker indicated by the flashing light and pushes on the door. The door opens and indicator shows "open" (for example, by displaying a different color and/or ceasing flashing). At step 577, the recipient has not opened the door within the time out period, so the indicator shows "closed" (for example, by displaying a particular color) and the lock-push-to-release mode is cleared. At step 578, the recipient is logged out and system logs failed to pick up transaction.

At step 579, after the door opens and the indicator shows open, the user removes the packages. The indicator shows "closed" and at step 580 the locker state is set to "clear." A transaction log is updated with picked up package and with the time. At step 581, it is determined if the user has another locker. If the answer is affirmative, step 570 is executed and control continues as described above. If the answer is negative, the resident leaves the locker area/mailroom with the packages.

At step 584, the administrative process begins. It will be appreciated that the functions and sequence of functions described here with respect to the administrative function can be varied according to the particular needs of the user and the system. At step 585 transaction logs are maintained. At step 586, daily transactions histories are emailed to the system administrator.

At step 587, package and locker management process begins. At step 588, a package expiration time can be set by the administrator. This time is the time allowed by the system for the recipient to retrieve their package after a code is entered and/or after the package has been received. At step 589, an expiration warning may be emailed to the resident to prompt pick-up of the packages. At step 590, package expiration notice is mailed to the recipient. At step 592, the agent takes action to clear unclaimed packages from the locker system.

Figure 6A:
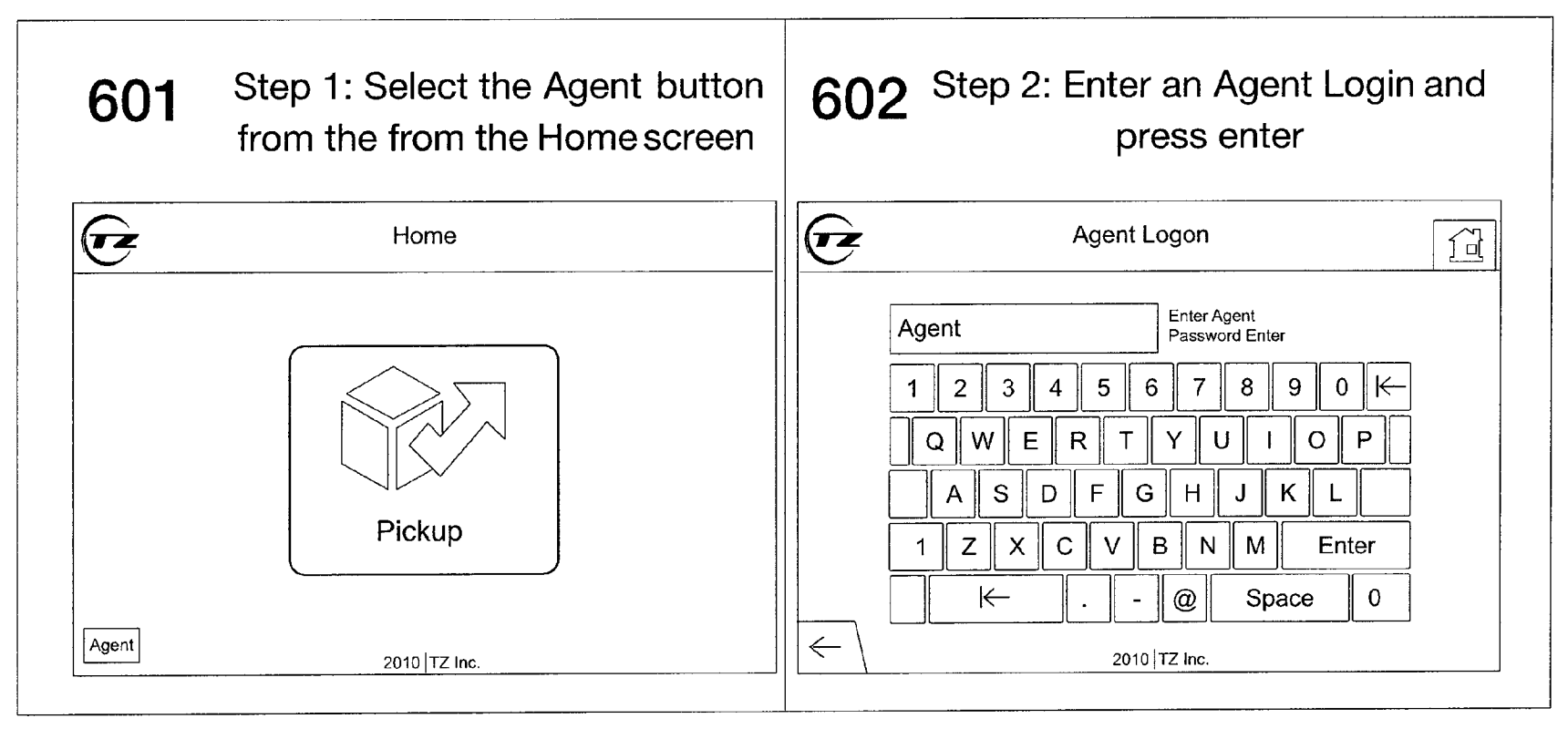
Figure 6B:
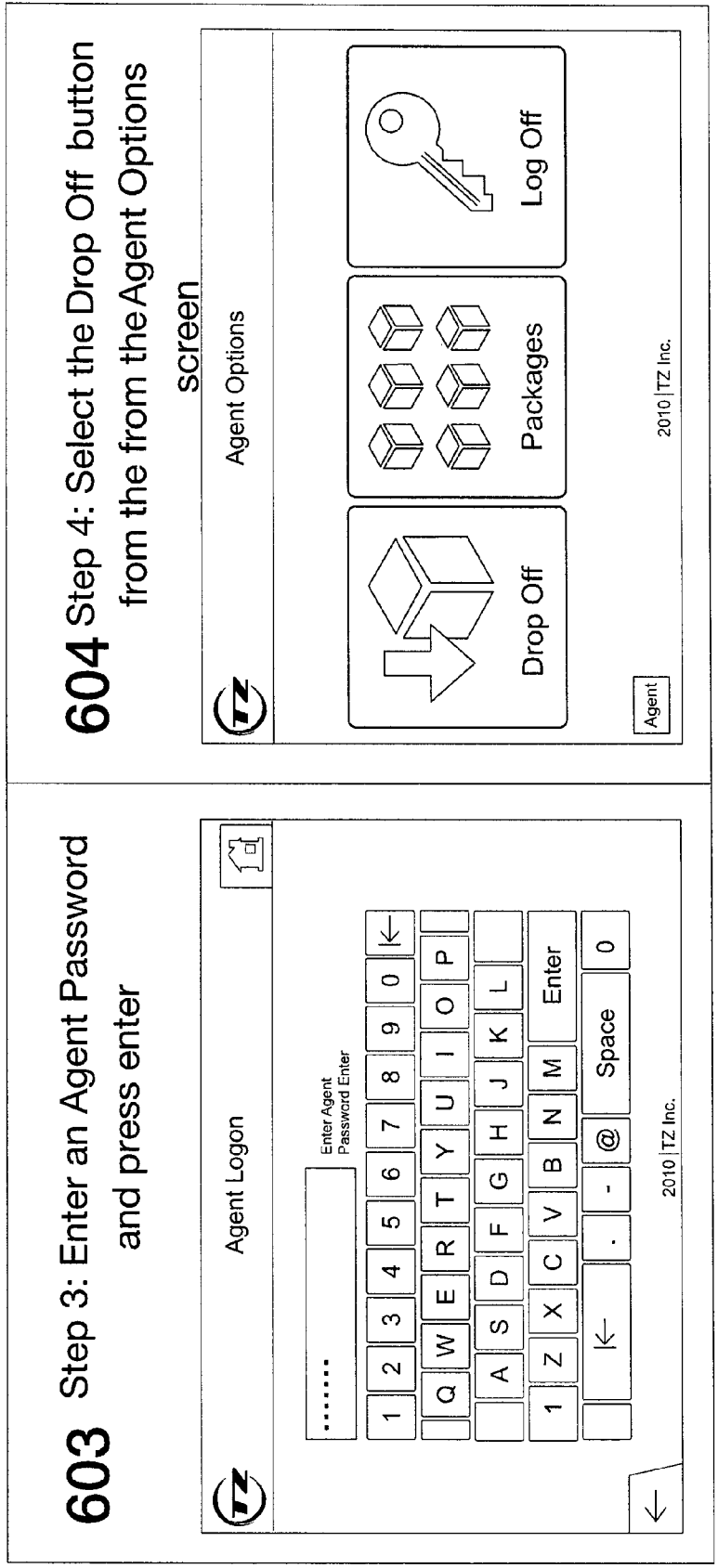
FIG. 6 shows one example of a series of display screens displayed during package drop off according to various embodiments of the present invention.
Figure 6C:
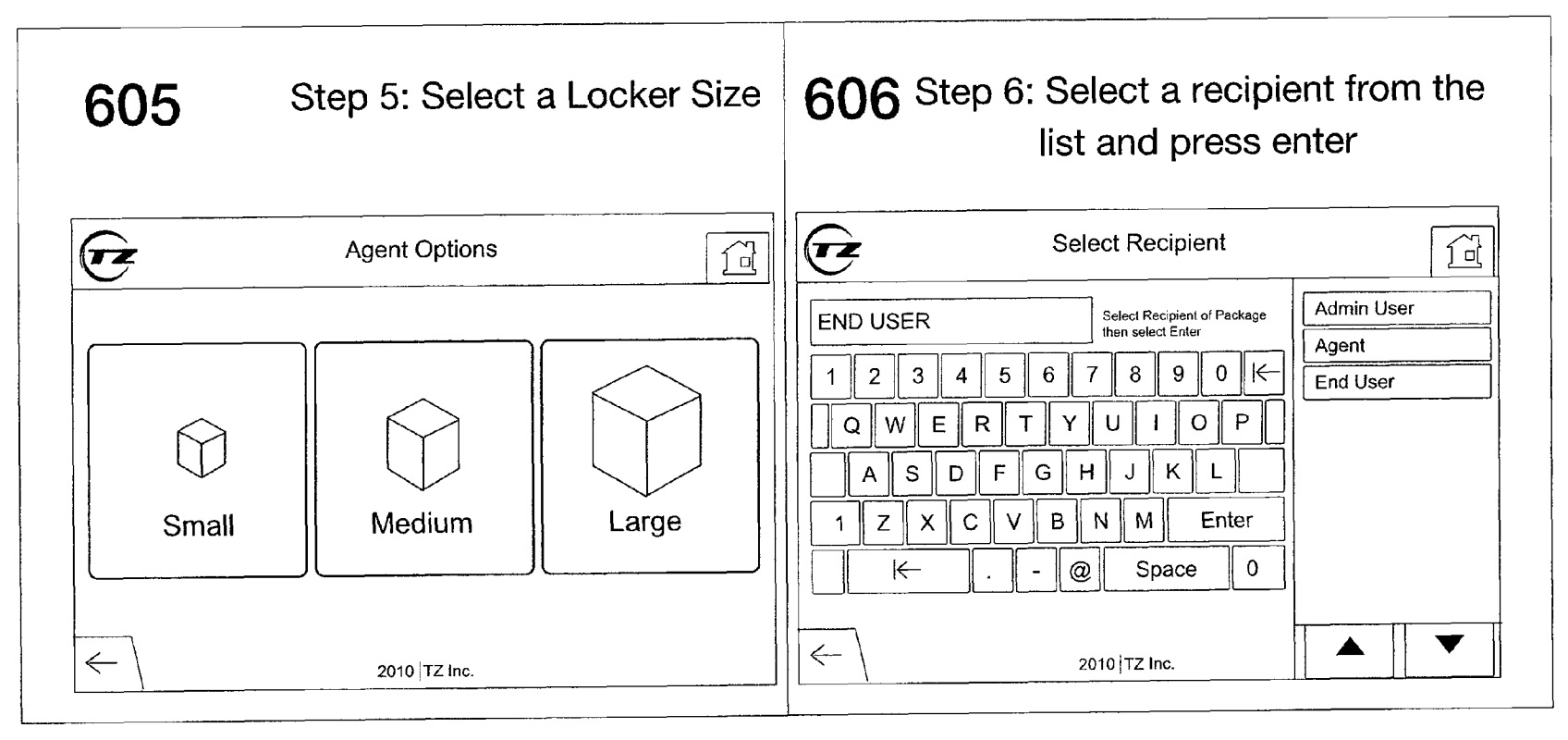
Figure 6D:
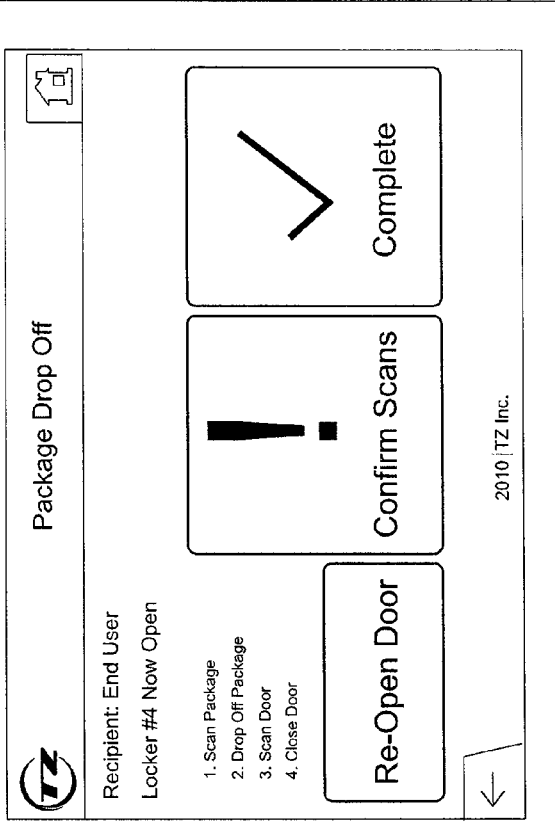
Figure 6E:
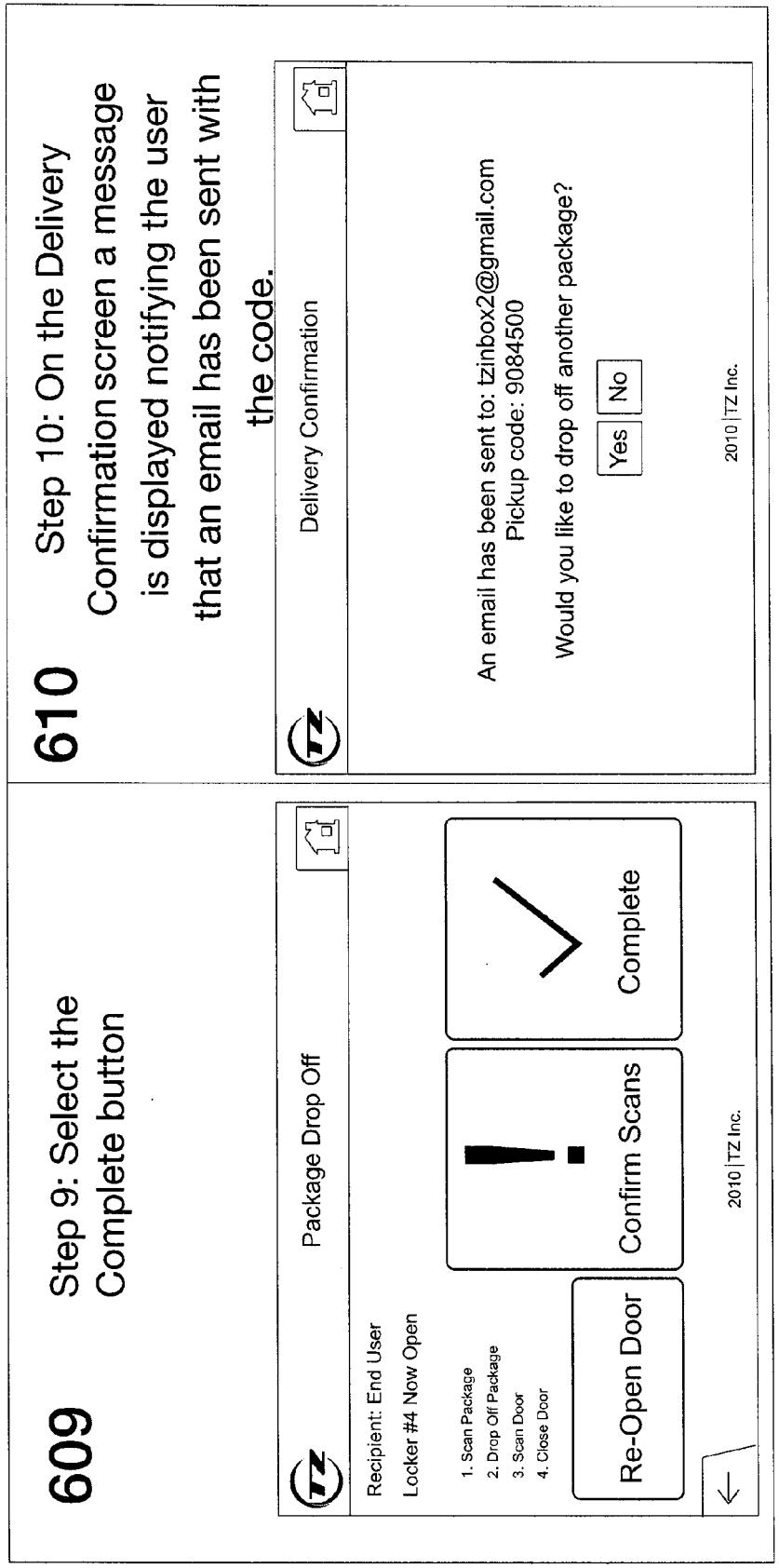

Referring now to FIG. 6, one example of touch screen displays presented to a drop-off agent is described. In this example, a package is dropped off at a locker system by the agent. The agent may be a delivery person, an attendant, or some other employee that is tasked with entering packages into the locker system. It will be appreciated that although the displays are presented as being touch-screen displays, other display or data entry units or devices (e.g., personal computers) can also be used. In addition, although this example involves the use of a locker arrangement, other storage areas can also be used. Finally, the example displays presented here are examples only and their sequence, content, and number can be varied to meet the needs of a particular user or application.

At step 601, the agent button is selected by the delivery agent from the home screen. At step 602, an agent login (e.g., user name) is entered on the key pad or the touch screen. At step 603, an agent password is entered from the touch screen or the keypad. The password and user name are verified. At step 604, a drop-off option is selected on the touch screen in order to begin the drop-off process as described elsewhere herein.

At step 605, the locker size is selected by the drop-off agent. At step 606, a recipient is selected from a list by the agent and "enter" is pushed on the screen by the agent. At step 607, a locker is opened by the application to allow the agent to place the package in the locker. Now, instructions are presented on the screen for the agent to scan the package, drop off the package, scan the door (to record the locker used), and close the door to the locker.

At step 608, the agent presses the confirm scan button after all scanning has been completed. At step 609, the complete button is selected and pressed by the agent. At step 610, a message is displayed notifying the agent that an email (or other message) is sent to the recipient. At step 611, a message is also displayed "Would you like to drop off another package?" In this example, the agent presses "no." At step 612, the home screen returns and another package can be dropped off.

Referring now to FIG. 7, one example of screen presented to a recipient picking up packages is described. As with the example of FIG. 6, it will be appreciated that although the displays are presented as part of a touch-screen display, other display or data entry units or devices can also be used. In addition, although this example involves the use of a locker arrangement, other storage areas can also be used. Finally, the example displays presented here are examples only and their sequence, content, and number can be varied to meet the needs of a particular user or application.

At step 701, the pickup button is selected from the home screen by the recipient. In this example, a package is dropped off at a locker system by an agent and the recipient has arrived at the locker system to retrieve their package(s). At step 702, the recipient enters the pickup code that has been sent to them. At step 703, after the code has been verified, the locker door opens and the locker number is displayed on the touch screen. Additionally an indicator at the actual locker may be activated to identify the locker to the recipient and make retrieval of the package easier. At step 704, the home screen returns.

It will be understood that many of the approaches described herein may be implemented as computer software (e.g., computer software instructions coded according to any computer language) that operate on any computer hardware platform. The computer hardware platform may be any combination of electronic hardware components such as microprocessors or the like. Additionally, memory storage devices may be used to temporary or permanently store the various data that is used, created, processed, and/or changed according to the approaches described herein.

Thus, approaches are provided that provide controlled access to one or more secured areas. The approaches allow packaged assets to be delivered to a recipient securely and easily without the use of an intermediate human attendant. The recipient is automatically informed of the delivery of the packaged asset and provided with an access code to open the secured area and retrieve the packaged asset. Accurate records are automatically created and maintained to facilitate package tracking. The recipient can retrieve the packaged asset without the need of a human attendant and this can potentially accomplished at all hours of the day and night. Since the packaged assets are stored in a secured area, theft and other such problems are substantially reduced or eliminated.

While the invention herein disclosed has been described by means of specific embodiments and applications thereof, numerous modifications and variations could be made thereto by those skilled in the art without departing from the scope of the invention.

What is claimed is:

1. A method for securely delivering a packaged asset through an apparatus having an interface and processor, the method comprising:
   providing a plurality of storage spaces, each storage space having a usage status of occupied or unoccupied;
   the interface receives data, the data including an indication that the packaged asset is available for delivery to an intended recipient, an indication of a size of the asset, and an identity of the intended recipient;
   the processor processing the data to identify in real time an available storage space from the plurality of storage spaces, based at least in part upon the size of the packaged asset and the identity of the intended recipient;
   the processor associating the available storage space with the intended recipient to determine the usage status;
   the processor transmitting an access code to the intended recipient, for accessing the available storage space; and
   the processor receiving the access code and allowing the intended recipient to access the available storage space, wherein the available storage space includes an occupied storage space capable of housing the packaged asset.

2. The method of claim 1, further comprising the step of activating a visual indicator to identify the available storage space.

3. The method of claim 1, further comprising the step of maintaining a log of received packaged assets and respective intended recipients.

4. The method of claim 1, wherein transmitting the access code comprises emailing the access code to the intended recipient via email.

5. The method of claim 1, further comprising the step of receiving a payment from the recipient for use of the available storage space.

6. An apparatus for controlling access to a plurality of storage spaces, each storage space having a respective locking arrangement communicatively coupled to a network hub, the apparatus comprising:

an interface configured to receive an indication that a packaged asset is available for delivery to an intended recipient, an indication of size of the packaged asset, and an identity of the intended recipient of the packaged asset; and a processor coupled to the interface, the processor configured to maintain a log of received packaged assets and intended recipients in a memory storage device to generate usage status of occupied or unoccupied for each storage space, the processor further configured to identify in real time an available storage space from the plurality of storage spaces, based at least in part on the usage status of the storage space, the size of the packaged asset and the identity of the intended recipient, the processor further configured to associate the available, storage space with an access code and transmit the access code to the intended recipient allowing the intended recipient to access the available storage space using the access code, wherein the available storage space includes an occupied storage space capable of housing the packaged asset.

7. The apparatus of claim 6 wherein the log in the memory storage device is accessible to a system administrator at substantially all times.

8. The apparatus of claim 6 wherein the interface is coupled to an Internet connection and the access code is transmitted to the recipient in an email via the Internet connection.

9. The apparatus of claim 6 wherein the processor is further configured to receive a payment from the intended recipient for use of the storage space via the interface.

10. A system for securely delivering a packaged asset, the system comprising:
    a network hub;
    a plurality of storage spaces, each storage space having a respective locking arrangement communicatively coupled to the network hub;
    an asset manager in communication with the network hub;
    a network for communication between the asset manager and an intended recipient;
    an interface having an input and an output, the interface in communication with the asset manager, the interface configured at the input to receive data including, an indication that the packaged asset is available for delivery to the intended recipient, identity of the intended recipient of the packaged asset, and an indication of size of the packaged asset;
    the asset manager configured to process the data to identify in real time an available storage space from the plurality of storage spaces, based at least in part on the size of the packaged asset and the identity of the intended recipient;
    the asset manager further configured to associate the available storage space with an access code an transmitting the access code at the output of the interface via the network to the intended recipient, the access code configured to open the locking arrangement associated with the available storage space; wherein the available storage space includes a storage space having the usage state used by the intended recipient or shared by the intended recipient with another user and is capable of housing the packaged asset.

11. The system of claim 10 wherein each locking arrangement includes a first lock disposed at a first end of the storage space and a second lock disposed at a second end of the storage space, wherein the access code opens one of the first and second locks.

* * * * *